(12) United States Patent
Egan

(10) Patent No.: US 11,782,671 B2
(45) Date of Patent: Oct. 10, 2023

(54) MASTER/SLAVE MODULAR DISPLAY SYSTEM

(71) Applicant: The Social Wall Ltd., London (GB)

(72) Inventor: Heather Egan, Kidbrooke (GB)

(73) Assignee: The Social Wall Ltd., Kidbrooke (GB)

( * ) Notice: Subject to any disclaimer, the term of this patent is extended or adjusted under 35 U.S.C. 154(b) by 0 days.

(21) Appl. No.: 17/784,888

(22) PCT Filed: Dec. 10, 2020

(86) PCT No.: PCT/GB2020/053169
§ 371 (c)(1),
(2) Date: Jun. 13, 2022

(87) PCT Pub. No.: WO2021/116688
PCT Pub. Date: Jun. 17, 2021

(65) Prior Publication Data
US 2023/0004338 A1    Jan. 5, 2023

(30) Foreign Application Priority Data
Dec. 13, 2019  (GB) ..................... 1918427

(51) Int. Cl.
*G06F 3/14*    (2006.01)
*G09G 5/12*    (2006.01)
*H04N 1/00*    (2006.01)

(52) U.S. Cl.
CPC ............ *G06F 3/1454* (2013.01); *G09G 5/12* (2013.01); *H04N 1/00185* (2013.01); *G09G 2360/04* (2013.01); *G09G 2370/16* (2013.01); *G09G 2380/16* (2013.01); *H04N 2201/0031* (2013.01)

(58) Field of Classification Search
CPC ........ G06F 3/1446; G06F 3/1454; G06F 3/14; G06F 3/1423; G06F 3/147; G09G 5/12;
(Continued)

(56) References Cited

U.S. PATENT DOCUMENTS 6,058,464 A      5/2000  Taylor
10,650,788 B2 *  5/2020  Capt ...................... G09G 5/14
(Continued)

FOREIGN PATENT DOCUMENTS

KR         20090028144 A      3/2009

OTHER PUBLICATIONS

Great Britain Search & Examination Report for Application No. GB1918427.4, dated May 1, 2020, 6 pages.
(Continued)

*Primary Examiner* — Koosha Sharifi-Tafreshi
(74) *Attorney, Agent, or Firm* — Barnes & Thornburg LLP

(57) ABSTRACT

A digital photo frame system is described herein. The system comprises a master digital photo frame configured to display a master media and a plurality of slave digital photo frames configured to display a plurality of slave media. The master digital photo frame is configured to provide power to the plurality of slave digital photo frames, and receive a media package from a storage location. The media package comprises the master media and the plurality of slave media. The master digital photo frame is configured to send each of the plurality of slave media to a respective slave photo frame.

17 Claims, 7 Drawing Sheets

(58) Field of Classification Search
CPC ......... G09G 2356/00; G09G 2300/026; G09G 2300/02; G09G 2380/16; G09G 2360/04; G09G 2370/20; G09F 9/3026; H04N 2201/0031; H04N 2201/0032; H04W 4/21; G06Q 50/01; G06V 20/30
USPC .......................................... 345/1.3; 348/383
See application file for complete search history.

(56) References Cited

U.S. PATENT DOCUMENTS

| | | | |
|---|---|---|---|
| 2009/0292822 A1* | 11/2009 | Blair | H04N 1/32523 709/238 |
| 2010/0207903 A1* | 8/2010 | Kim | H04M 1/0254 345/1.3 |
| 2014/0313103 A1 | 10/2014 | Goel et al. | |
| 2015/0084837 A1* | 3/2015 | Mese | G06F 3/1446 345/1.3 |
| 2016/0034240 A1 | 2/2016 | Kreiner et al. | |
| 2016/0034242 A1 | 2/2016 | Cho et al. | |
| 2016/0093271 A1 | 3/2016 | Cho et al. | |
| 2016/0255162 A1* | 9/2016 | Frieder | H04W 4/21 709/204 |

OTHER PUBLICATIONS

Written Opinion and International Search Report for Application No. PCT/GB2020/053169, completed Jan. 29, 2021, 16 pages.
Great Britain Further Search Report for Application No. GB1918427. 4, dated Oct. 7, 2020, 2 pages.

* cited by examiner

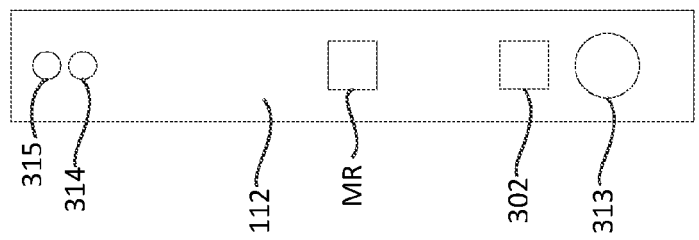
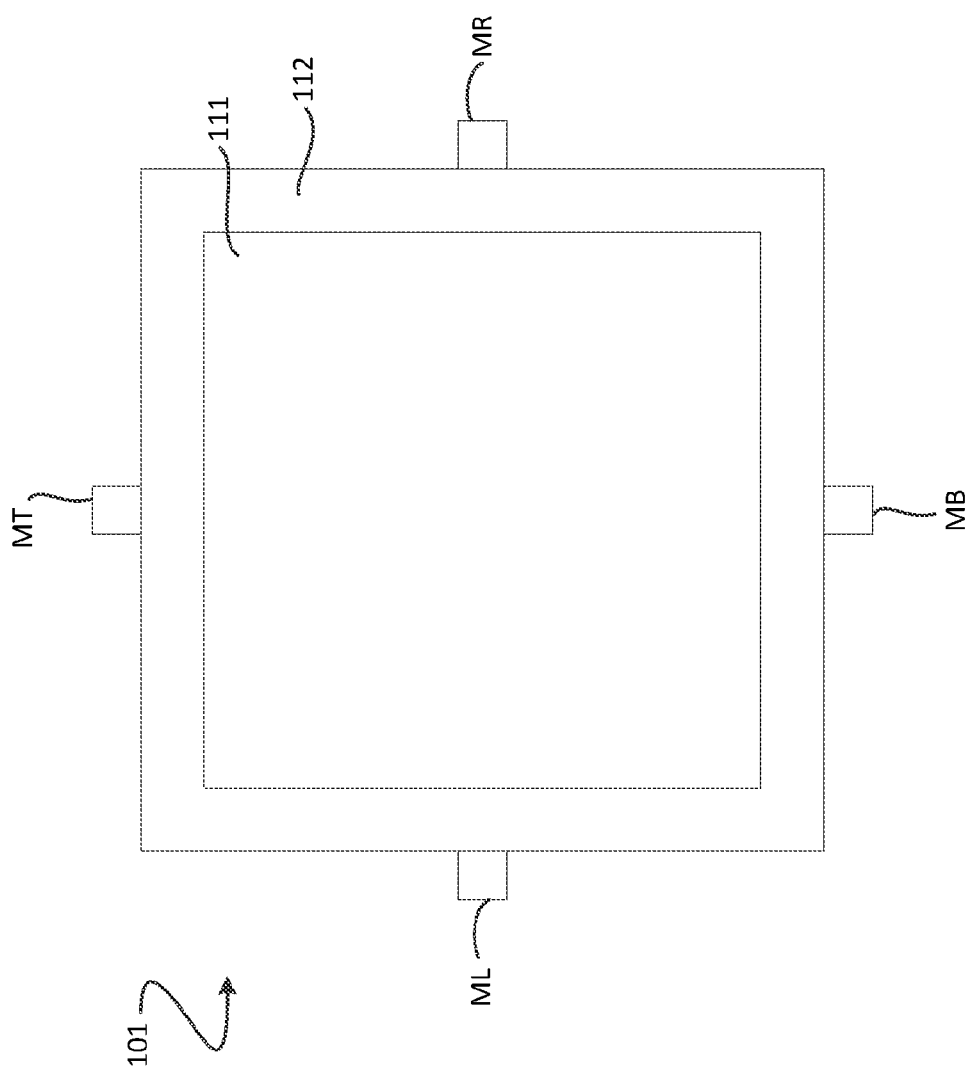
Figure 1B
Figure 1A

MASTER/SLAVE MODULAR DISPLAY SYSTEM

TECHNICAL FIELD

The present disclosure relates generally to a digital display system and method, such as a digital photo frame system and a method of displaying images on the digital photo frame system.

BACKGROUND

A typical digital photo frame comprises a single display that may be operated to shuffle through a selection of images that have been pre-loaded onto the photo frame. In a society that makes use of social media and the ubiquitous use of smart phones, there is a desire to display more relevant images and a greater selection of images. Further, conventional digital photo frame systems are dated and limited in their functionality.

SUMMARY OF THE INVENTION

Aspects of the invention are set out in the independent claims and optional features are set out in the dependent claims. Aspects of the disclosure may be provided in conjunction with each other, and features of one aspect may be applied to other aspects.

Embodiments of the present disclosure provide a digital photo frame display system comprising a master digital photo frame and a plurality of slave digital photo frames wherein the master digital display system provides power to the plurality of slave digital photo frames, therefore resulting in a system which requires only a single power supply and/or power source.

Embodiments of the present disclosure provide a digital photo frame display system which may provide a means of displaying a greater variety and selection media, and media that is more relevant and up to date (e.g. images from social media platforms/social networking websites such as Facebook® or Instagram®). The digital photo frame display system may allow an end user to change the media displayed in each of the digital photo frames, and such media may comprise media that has recently been created (e.g. images that have recently been uploaded to social networking websites such as Facebook® or Instagram®). For example, the user may use a computer program on a computing device to instruct the master digital photo frame to retrieve different media from a social networking website.

Embodiments of the present disclosure may also provide a digital photo frame display system that is customisable by a user to display a selected plurality of different images. For example, embodiments of the present disclosure provide a modular digital photo frame system where the number and/or arrangement of the digital photo frames can be altered by a user into any user-customisable arrangement.

For example, embodiments of the disclosure provide a digital photo frame system comprising a master digital photo frame and a plurality of slave digital photo frames. The master digital photo frame and the slave digital photo frames are suitable for mounting on a wall to provide the digital photo frame display system. In some examples, only the master digital photo frame is fixed to a wall and the slave digital photo frames may be fixed to the master digital photo frame and/or other slave digital photo frames by contiguous coupling means which may be configured to allow releasable contiguous coupling of any two of the digital photo frames. In some examples of the present disclosure, the digital photo frames of the digital photo frame display system may all have an identical polygonal shape (e.g. rectangle) or regular polygonal shape (e.g. square shape). Conveniently, example digital photo frame display systems comprising digital photo frames with a regular polygonal shape may allow an end user to tessellate the frames together into any configuration they desire.

In a first aspect of the disclosure there is provided a digital photo frame system comprising: a master digital photo frame configured to display a master media; a plurality of slave digital photo frames configured to display a plurality of slave media; wherein the master digital photo frame is configured to: provide power to the plurality of slave digital photo frames; receive a media package from a storage location, wherein the media package comprises: the master media; and, the plurality of slave media; and wherein the master digital photo frame is configured to send each of the plurality of slave media to a respective slave photo frame.

A typical digital photo frame system may comprise a plurality of independent digital photo frames. Typical digital photo frame systems therefore require power to be provided to each of the digital photo frames. Therefore, embodiments of the first aspect may provide a digital photo frame system which only requires a single power supply.

The master digital photo frame may comprise a media interface configured to wirelessly transmit media package requests to the storage location and/or wirelessly receive the media package from the storage location. The storage location may be remote from the digital photo frame system—for example the storage location may be held on a computing device and/or in the cloud. For example, the media interface may be configured to communicate with the storage location via a short range radio frequency network, such as via a Bluetooth® and/or a WiFi® network, and/or via a telecommunications network, such as via the internet.

In some examples the master digital photo frame may additionally or alternatively comprise a computing device interface configured to wirelessly receive media package requests from a computing device. For example, the computing device interface may be configured to communicate with the computing device via a short range radio frequency network, such as via a Bluetooth® and/or a WiFi® network, and/or via a telecommunications network, such as via the internet.

In some examples the master digital photo frame comprises a connector such as a slave communications interface configured to transmit slave media from the master digital photo frame to the slave digital photo frames. The slave communications interface may be configured to communicate with slave digital photo frames via a wired or wireless network. In the case of a wireless network, such as a short range radio frequency network, for example a Bluetooth® and/or Zigbee® network. In the case of a wired network, the slave communications interface may comprise, for example, a USB-C interface or an Ethernet interface.

In embodiments the connector may be low profile (e.g. connectors disposed at a rear of each digital photo frame wherein the connectors are joined by a small bridging board).

In embodiments the connector may be configured to provide electrical power comprising at least 20 V and at least 3 A. In embodiments the connector may be configured to provide high-speed communications. For example, the connector may comprise a suitable impedance for high-speed communications. For example, the connector may provide suitable grounding for high-speed communications.

In embodiments the connector may be hermaphroditic.

In embodiments, a connector on a first digital photo frame may comprise a sprung contact configured to contact a flat pad connector on a second digital photo frame.

In embodiments the connector may be integrated into a housing of digital photo frame.

In embodiments the slave communications interface may be configured to communicate with the master communications interface by any of the following communications methods: SPI; Ethernet; Zipwire; LVDS.

In embodiments the master communications interface may be configured to communicate with the slave communications interface by any of the following communications methods: SPI; Ethernet; Zipwire; LVDS.

The master digital photo frame may be configured to process media packages received from the storage location into respective master media and plural slave media; and, transmit each of the plural slave media to the respective plural slave digital photo frames via the slave communications interface. In some examples the slave communication interface comprises media connections configured to physically connect the master digital display to the plurality of slave digital displays, and wherein the master digital photo frame transmits each of the plural slave media to the respective plural slave digital photo frames via the media connections of the slave communications interface. It will be understood that the media connections may be configured to allow power to be transferred from the master digital photo frame to the plurality of slave digital photo frames.

In some examples the master digital photo frame is configured to generate a map of the display system based on respective locations of the plurality of slave digital photo frames to the master digital photo frame. In some examples the master digital photo frame may send the generated map to a computing device. The computing device may, for example, be a handheld device such as a smartphone or tablet that is running a computer program configured to communicate with the master digital frame and optionally control the media displayed by the master and slave digital photo frames.

In some examples the master digital photo frame is configured to send location requests to the respective plurality of slave digital photo frames via the slave communications interface. The slave digital photo frames may be configured to send a location response to the master digital photo frame via the communication interface, wherein the location response of each respective slave digital photo frame comprises any one or more of the following data:
 an identifier of the individual slave digital photo frame;
 one or more identifiers of other slave digital photo frames to which the individual slave digital photo frame is directly connected;
 a time taken for the location request to be received by the respective slave digital photo frame.

The media package request may comprises a master and slave media request portion, configured to instruct the storage location to send specified master and slave media to the master digital photo frame; and, a location portion, configured to instruct the master digital photo frame to send each of the plural slave media to respective slave digital photo frames based on the generated map. The master and slave media request portion and the location portion of the media package request may, for example, be determined by a user input on the computing device.

In some examples each of the master digital photo frame and/or the plurality of slave digital photo frames comprises an orientation sensor configured to determine an orientation of each of the frames; and, each of the master digital photo frame and/or the plurality of slave digital photo frames is configured to display the respective media at an orientation based on the determined orientation of the frame.

In some examples, connectors of the master digital photo frame, such as the slave communications interface, may have an associated master connector identifier. In some examples, connectors of the slave digital photo frames such as the master communications interface may have an associated slave connector identifier. A connection between two digital photo frames comprises a connector from a first digital photo frame connected to connector from a second digital photo frame (e.g. a connection comprising a connector of a master digital display connected to a connector of a slave digital display; or, a connection comprising a connector of a slave digital display connected to a connector of another slave digital display). The connector identifier of each connector forming a particular connection may be obtained by a computing device and/or the master digital photo frame, and hence information indicative of which connectors are connected to one another may be obtained.

For example, the connector identifiers may comprise any of: barcode; QR code; serial number of a component; printed alphanumeric sequence; symbolic representation.

In some examples, connectors of the master digital photo frame may have an associated master connector identifier. For example, the master digital photo frame may comprise four connectors, such as the slave communications interface, a master-top port, a master-left port, a master-bottom port, a master-right port with respectively connector identifiers MT, ML, MB, MR. In some examples, connectors of the slave digital photo frames may have an associated slave connector identifier. For example, a first slave digital photo frame may comprise four connectors, a first slave-top port, a first slave-left port, a first slave-bottom port, a first slave-right port with respectively connector identifiers 1ST, 1SL, 1SB, 1SR. A connection between two digital photo frames comprises a connector from a first digital photo frame connected to connector from a second digital photo frame (e.g. a connection comprising a connector of the master digital display connected to a connector of the first slave digital display). The connector identifier of each connector forming a particular connection may be obtained by a computing device and/or the master digital photo frame, and hence information indicative of which connectors are connected to one another may be obtained. A map of the digital photo frame system may be obtained using the information indicative of which connectors are connected to one another. For example, if the master-bottom port with identifier MB is connected to the first slave-top port 1ST, then information indicative of which connectors are connected to one another may be "MB-1ST" or alternatively "1ST-M D".

For example, the connector identifiers may comprise any of: barcode; QR code; serial number of a component; printed alphanumeric sequence; symbolic representation.

In some examples it will be understood that at least any two of: the master digital photo frame; and the plurality of slave digital photo frames comprise contiguous coupling means configured to allow releasable contiguous coupling of any two of the digital photo frames.

In another aspect of the disclosure there is provided a kit of parts comprising the master digital photo frames as described above, and a plurality of slave digital photo frames as described above. It will be understood that the master digital photo frame is configured to provide power to the plurality of slave digital photo frames.

It will be understood that in some examples the system may comprise other display means other than a digital photo frame. Accordingly, in another aspect of the disclosure there is provided a master digital display comprising: a display configured to display a master media; and one or more connectors (such as slave communications interface) configured to: provide power to one or more slave digital photo frames and send slave media to one or more slave digital displays. It will be understood that the master digital display may be configured for use with the digital photo frame system described above. The master digital display also comprises a media interface configured to wirelessly transmit media package requests to a remote storage location, and wirelessly receive the media package from the storage location, and a computing device interface configured to wirelessly receive media package requests from a computing device.

In another aspect of the disclosure there is also provided a slave digital display comprising a display configured to display a slave media; and one or more connectors (such as master communications interfaces) configured to: receive power from a master digital display and receive slave media from the master digital display. The slave digital display may also comprise a processor configured to provide an identifier to the master digital display for uniquely identifying the slave digital display. It will also be understood that the slave digital display may be configured for use with the digital photo frame system described above.

In another aspect of the disclosure there is also provided a computer program for use with a computing device, such as the computing device described above. The computer program is configured to generate a map of a digital photo frame display system comprising a master digital photo frame and a plurality of slave digital photo frames by performing the steps of: generating, on a display of the computing device, a representation of each of the master digital photo frame and the plurality of slave digital photo frames; receiving, from an input of computing device, identifiers from each of the master digital photo frame and the slave digital photo frames; assigning, each of the identifiers to each respective representation of the master digital photo frame and the slave digital photo frames.

In some examples the computer program is configured to select, a master media to be displayed on the master digital photo frame; select, each slave media to be displayed on each respective slave digital photo frame; and generate a media package request based on the selected master and slave media and the generated map. The computer program may additionally or alternatively be configured to transmit the generated media package request, using the computing device, to a storage location. In some examples the computing device is additionally or alternatively configured to transmit the generated media package request, using the computing device, to the master digital photo frame of the digital display system.

It will also be understood that the computer program may be configured to interact with the digital photo frame/digital display system described above. For example, the computer program may be configured to control the computing device to communicate with the master and/or slave digital photo frames/display devices described above.

The master digital photo frames and the slave digital photo frames may be referred to as "master bricks" and "slave bricks" respectively. The master bricks and slave bricks may be configured to be joined together to form a "wall".

In some examples, additional bricks may be provided.

In some examples, an information brick may be provided which may be configured to receive and display information. Some examples of information to be displayed include: live weather information; weather forecasts; live traffic information; traffic forecasts; traffic notifications (e.g. local road works); live camera feed information (e.g. a feed from a camera such as a Ring® camera). The information brick may be configured to receive power from the master digital photo frame (master brick). The information brick may be configured to function as a slave digital photo frame (slave brick). The information brick may be configured to operate independently of the master brick.

In some examples, a social sharing brick may be provided which may be configured to receive and display social data. Some examples of social data include: reminders (e.g. shopping lists etc.); well wishes (e.g. happy birthday notifications); social media feeds (e.g. live Twitter® feed etc.). The social sharing brick may be configured to receive power from the master digital photo frame (master brick). The social sharing brick may be configured to function as a slave digital photo frame (slave brick). The social sharing brick may be configured to operate independently of the master brick. The social sharing brick may be configured to receive social data from specific trusted computing devices. For example, an administrator who owns or manages the digital photo frame display and/or the social sharing brick may grant sharing privileges to specific trusted computing devices.

In some examples, an art brick may be provided which may be configured to receive and display art media. Some examples of art media include: art collection media (e.g. a feed comprising images of paintings and sculptures in an art exhibition); photography media (e.g. a feed comprising images of nature; e.g. a feed comprising selected images from National Geographic etc.). The art brick may be configured to receive power from the master digital photo frame (master brick). The art brick may be configured to function as a slave digital photo frame (slave brick). The art brick may be configured to operate independently of the master brick.

DRAWINGS

Embodiments of the disclosure will now be described, by way of example only, with reference to the accompanying drawings, in which:

FIG. 1A illustrates a front plan view of an example master digital photo frame of embodiments of the disclosure;

FIG. 1B illustrates a side view of the example digital photo frame of FIG. 1A,

SPECIFIC DESCRIPTION

Figure 2:
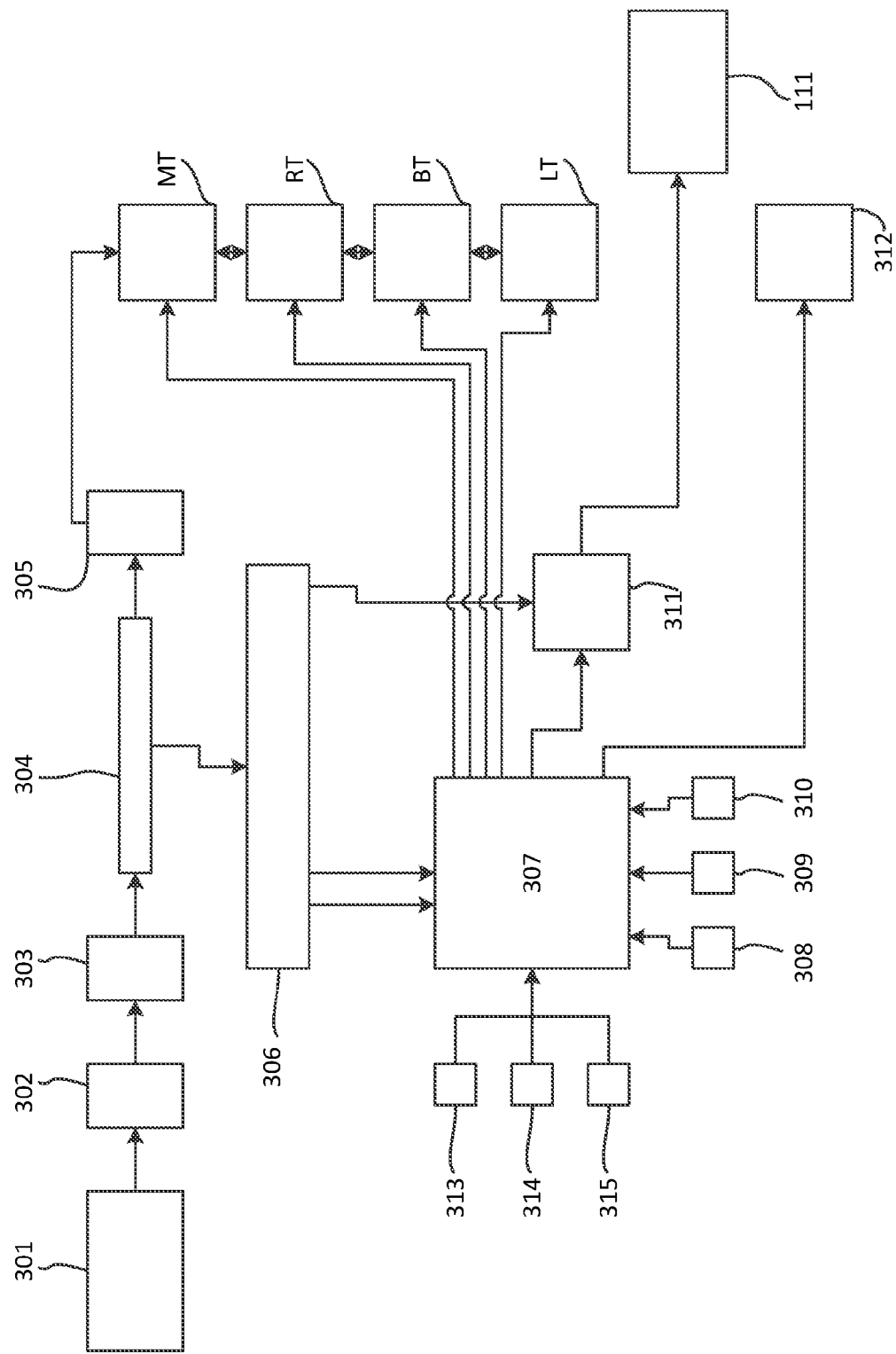
FIG. 2 illustrates a schematic functional diagram of the example master digital photo frame of FIGS. 1A and 1B.

Embodiments of the disclosure relate to a digital photo frame system. The system may comprise a master digital photo frame 101 as described below with reference to FIGS. 1A, 1B and 2, and a plurality of slave digital photo frames 201, 202, 203 as described below with reference to FIGS. 3A, 3B and 4.

FIG. 1A illustrates a front plan view of an example master digital photo frame 101 and FIG. 1B illustrates a side view of the master digital photo frame 101 of FIG. 1A.

In the example shown, the master digital photo frame 101 comprises: a master display 111 located generally centrally within and on a front face of a master housing 112. On one edge (in this example, right hand edge when looking at the master display 111) of the master housing 112 there is provided an optional status indicator 315, an optional occupancy sensor 314, a power inlet 302, an optional on/off switch 313 and a master-right port MR. Along a top edge of the housing there is provided a master-top port MT, along a bottom edge of the housing 112 there is provided a master-bottom port MB, and along a left hand edge of the housing 112 there is provided a master-left port ML. However, it will be understood that in other examples any or all of the ports may be provided on the same edge, for example the master-bottom MB, the master-top MT, the master-left ML and/or the master-right MR ports may be provided on the same edge of the housing 112. In some examples, the master ports MR, MT, MB, ML may be disposed at a rear side of housing 112/of the master digital photo frame 101. In some examples, the power inlet 302 may be disposed on a rear side of the housing 112/of the master digital photo frame 101. In some examples, the optional on/off switch 313 may be disposed on a rear side of the housing 112/of the master digital photo frame 101. In some examples, the optional occupancy sensor 314 may be disposed at a front side of the housing 112/of the master digital photo frame 101. In some examples, the optional status indicator 315 may be disposed at a front side of the housing 112/of the master digital photo frame 101.

FIG. 2 illustrates a schematic functional diagram of the example master digital photo frame 101 of FIGS. 1A and 1B. FIG. 2 shows a main circuit board that is provided within the housing 112. The main circuit board supports (by having mounted thereon) a master processor 307. The master processor 307 is coupled to the on/off switch 313, occupancy sensor 314 and status indicator 315. The master processor 307 is also coupled to RAM memory 308, flash memory 309 and a security integrated circuit (IC) 310. The master processor 307 is also coupled to the master display 111 via a display driver 311.

The master processor 307 is also coupled to a combined media and computing device interface 312, which in the example shown is a combined WiFi® and Bluetooth® module. However, it will be understood that in other examples separate media and computing device interfaces may be provided.

The master processor 307 is also coupled in parallel to a plurality of connectors that provide media connections for coupling to respective slave digital photo frames. In the example shown the respective media connections are provided by the master-top MT, master-bottom MB, master-right MR and master-left ML ports. In the example shown connectors/the media connections also double as slave communications interfaces. In this way, each connector/media connection also provides a corresponding slave communications interface. However, it will be understood that in other examples the media connections may be different to the slave communications interface, such that a separate slave communications interface is provided—for example there may be a plurality of media connections for coupling to respective slave digital photo frames, but only a single slave communications interface. In the example shown the master ports MT, MR, MB, ML, are of a polarised, bottom-mounted, through-hole type.

The media connections are also coupled to a power converter 306 via a 20V power bus and protection ICs 305. It will of course be understood that the power bus may be operable at other voltages. The power converter 306 is also coupled to the master processor 307 via respective power lines 3061 and 3062 operating at 1.8 and 3.3 V respectively. The power converter 306 is also coupled to display driver 311 for providing power to the display 111. The power converter 306 is also coupled to a power supply 301 via a power inlet 302 (which in the example shown is a USB-C interface) and a power IC 303 via the 20V power bus.

In the example shown the housing 112 comprises apertures to allow the master ports MT, MR, MB, ML to be connected to slave ports of slave digital photo frames, for example, to slave ports of a first slave digital photo frame S1T, S1R, S1B, S1L.

In the example shown, the housing 112 and the display 111 are both square. Advantageously this means that the digital photo frame can be displayed in any orientation and also means that when a collection of master and slave digital photo frames are provided as part of a system, they can advantageously be rearranged by the user in a modular manner to provide a variety of geometric arrangements/patterns, which may not be possible if the photo frames were rectangular.

However, it will be understood that in some examples, the master digital photo frame 101 may comprise a frame with any polygonal shape having N sides (where N>2). The master digital photo frame may comprise up to N master ports. Each master port may be disposed on a separate side of the frame. In some examples, the digital photo frames of the digital photo frame display system may all have an identical regular polygonal shape (e.g. rectangular shape) or regular polygonal shape (e.g. square shape).

The status indicator 314 may be a dual colour LED (e.g. red/green LED). The LED may be connected to the processor on pins suitable for PWM drive. The dual colour LED may indicate a variety of conditions by displaying: a single colour continuously; both colours simultaneously; a single colour intermittently; both colours intermittently.

The occupancy sensor 314 may comprise surface-mount circuitry on the main circuit board 300, and a sensor. The sensor may also be mounted to the main circuit board 300 using surface-mount components. A lens may be required which may be integrated into the master frame 112 or which may be added during assembly of the master digital photo frame 101.

The RAM 308 may be any of: DDR type; DDR2 type; DDR3 type. The RAM size may be within the range of: 1 Gbit to 8 Gbit. The RAM clock speed depends on processor support, interface and bandwidth requirements. The RAM clock speed may be in the range of 200 MHz to 400 MHz.

The flash memory 309 may comprise a Serial SPI interface with a clock frequency of greater than or equal to 80 MHz. For example the Serial SPI interface may be double-SPI or Quad-SPI. The flash memory 309 may comprise a non-volatile NAND flash. Advantageously, non-volatile NAND flash provides a greater speed of erase and write in comparison to NOR flash. The flash memory 309 may be sized to store approximately 200 images of 250 Kbyte size during power-down. The flash memory 309 may comprise space for general application storage. The flash memory size may be within the range of: 1 Gbit to 2 Gbit. The flash memory 309 may comprise: built in error-correction (ECC); bad block handling; wear levelling. In some examples, the flash memory 309 may not comprise any of: built in error-correction (ECC); bad block handling; wear levelling; in which case software is provided to perform these functions.

The master display 111 may be any of an LED display, an IPS panel, an OLED display, an LCD display, a TFT display, a DLP monitor, a plasma display. In appropriate examples (e.g. for LCD displays) the display may be backlit. For example, the display may be backlit by LEDs. In examples wherein the master display 111 requires a backlight, more than 50% of the output power from the power converter 306 may be required to power the backlight.

In some examples the master digital photo frame 101 comprises an orientation sensor (not shown) configured to determine an orientation the master digital photo frame. For example, the orientation sensor may be an accelerometer. The master digital photo frame 101 is configured to display the respective media at an orientation based on the determined orientation of the frame.

An example master processor 307 for use in the master digital photo frame 101 is an ARM Cortex-A® series based processor. The processor may have any one or more of the following minimum features: Video decode hardware; JPEG encode hardware; 2D image accelerator block; Globally Unique ID; JTAG programming Interface; a I2C Interface; four 150 Mbit/s SPI Interfaces; an UART; two ADCs; RAM Interface—Support DDR, 16 bit bus width min @ 133 MHz; Flash Interface—Support NAND, 16 bit bus width min; two DMA Controllers; AMBA System Bus; LCD interface, with 24 bit Parallel, MIPI-DPI, or LVDS; SDIO interface for the Wifi®/BLE® module; MPU for memory protection.

The media connections may comprise power and ground connections between master ports and slave ports. Each media connection may be rated for a combined PCBA total input and/or output of 3 Amp continuous. Each media connection may be rated to allow a full current of 3A through a single media connection with an average power-ground loop resistance of less than or equal to 72 mΩ.

The power supply 301 is configured to supply power to the power inlet 302 of the master digital photo frame. The power supply 301 may be a main power supply or a battery, for example a lithium-ion battery. In some examples the power supply 301 may be provided as part of the master digital photo frame 101 and provided inside the housing 112.

The power inlet 302 is configured to receive power from the power supply 301. The power inlet 302 may be a female USB Type-C. The power inlet may have a 3 Amp rating or more preferably a 5 Amp rating. The power inlet 302 may be configured to provide power from the power supply 301 to power bus 304 via a USB-C power delivery sink controller 303.

The power bus 304 may be configured to provide power to the media connections which in the example shown are master ports MT, MR, MB, ML. In this way the master ports MT, MR, MB and ML each function as both a power connection and a slave communication interface to a respective slave digital photo frame (described in more detail below) to transfer both power and data to respective slave digital photo frames. The protection ICs 305 may be configured to provide electrostatic discharge (ESD) protection. The protection ICs 305 may be configured to provide overvoltage protection. There may be provided current-limit protection on the power outputs of the master ports MT, MR, MB, ML.

As noted above, in the example shown the respective media connections (the master ports MT, MR, MB, ML) also double as slave communications interfaces. This means that in the example shown the master ports MT, MR, MB and ML are operable to both supply power to slave digital photo frames and also send media to each slave digital photo frame coupled to the master ports MT, MR, MB and ML. However, it will be understood that in other examples the media connections may not double as slave communications interfaces and or that only a single media connection and/or slave communications interface may be provided for coupling to a plurality of slave digital photo frames. For example, a separate slave communications interface (such as a wireless interface, for example operable over a short range RF network such as a Bluetooth® and/or Zigbee® network) may be provided. It will be understood that when a system comprising such a master digital photo frame 101 is provided that the slave digital photo frames will comprise corresponding communications interfaces and/or media connections for communicating with the master digital photo frame 101.

The power converter 306 is configured to convert an input voltage from the power bus 304 into one or more output voltages on one or more output rails 3061, 3062. An input voltage may be 20V and a first output rail 3061 may have a first output voltage of 1.8V and a second output rail 3062 may have a second output voltage of 3.3V. In some examples, there may be additional output rails with output voltages suitable for providing a voltage to a master display 111.

A desired power conversion may be achieved with a wide input range. In some examples, power converters operating receiving an input voltage of 20V directly from the power bus 304. In some examples a first buck converter stage may be provided to generate a lower intermediate voltage, which intermediate voltage is input into the power converter 306.

The power converter 306 may have any of: under-voltage lock-out; over-voltage lock-out; over-current; over-temperature protections. The power converter 306 may report its "power good" status to the master processor 307.

The master processor 307 is configured to receive power from an output rail of the power converter 306. The master processor 307 is configured to process media packages received by the master processor 307. The master processor 307 is configured to send slave media from a media package to each respective slave digital photo frame via the media connections.

The master display 111 is configured to display media. The media may be a master media received by the master digital photo frame 101 as part of a media package. The master media is transmitted to the master display 111 by the master processor 307. The master display 111 may be configured to receive power from the power converter 306.

In some examples, the master media may be transmitted to the master display 111 by the master processor 307 via the display driver 311. The display driver 311 may be configured to receive power from the power converter 306 via the display driver 311. In some examples the display driver 311 may require several power supplies. In some examples the display driver may require a driver IC. The media may be an image and/or a video.

The master processor 307 is configured to utilise RAM 308 to perform tasks and calculations. The RAM 308 may be configured to satisfy the size and memory bandwidth for a frame buffer. The random access memory size required for the frame buffer to operate the largest display may be expressed mathematically as:

$$\text{frame buffer} = \text{pixels horizontal} * \text{pixels vertical} * \text{pixel colour depth}$$

In some examples, two frame buffers may provide double-buffering to reduce graphic artifacts.

In the example shown the master processor 307 is also configured to utilise flash memory 309. The flash memory 309 is configured to store data and files when the master digital photo frame 101 is powered off. The flash memory 309 may be configured to store any of: image data; video data; other data which must be stored when offline.

The security IC 310 may be configured to store any of: a secure key; and, a security certificate. The master digital photo frame 101 may comprise secure hardware configured to perform cryptographic operations such as AES and Public/Private key encryption/decryption and signing/verification. In some examples, the master processor 307 may comprise secure hardware.

The ON/OFF switch 313 is configured to be operable between an "on state" and an "off state" wherein, in the on state power is supplied to the master digital photo frame 101 and in the off state, power is not supplied to the master digital photo frame 101.

The ON/OFF switch 313 may control an enable into the power converter 306 to switch the power to the master digital photo frame 101, rather than directly interrupt the power. For example, the power converter 306 may contain a hold-up capacitance sufficient to allow a graceful shut-down of all functions, and supply a signal to the master processor 307 to indicate the power is about to fail.

The occupancy sensor 314 is configured to sense one or more environmental conditions. The occupancy sensor 314 may be configured to detect motion in the proximity of the occupancy sensor (e.g. detect motion in a room within which the master digital photo frame is disposed). For example the occupancy sensor 314 may comprise a passive infra-red sensor. The occupancy sensor 314 may be configured to send a signal to the master processor 307 which is indicative of detected environmental conditions. In examples wherein the occupancy sensor 314 is configured to detect motion in the proximity of the sensor the occupancy may send a data indicative of detected motion to the master processor 307. If the master processor 307 does not receive data indicative of detected motion to the master processor 306 within a selected time period (e.g. 60 minutes), the master processor 306 may be configured to initiate a shutdown of the master digital photo frame 101 and in turn the digital photo frame system. In such examples, the master processor 307 may be configured to turn on the master digital photo frame 101 when an authorised computing device 251 connects to a local WiFi® network.

The optional status indicator 315 may be configured to indicate on or more of conditions of the master digital photo frame 101. The conditions may be any of: Device OFF; Device ON, Status OK, Active; Device ON, Status OK, Standby; Device ON, No internet connection; Device ON, No configuration; Device ON, Error. It will be understood that this may be achieved by illuminating different LEDs and/or LEDs with different colours.

Figure 3:
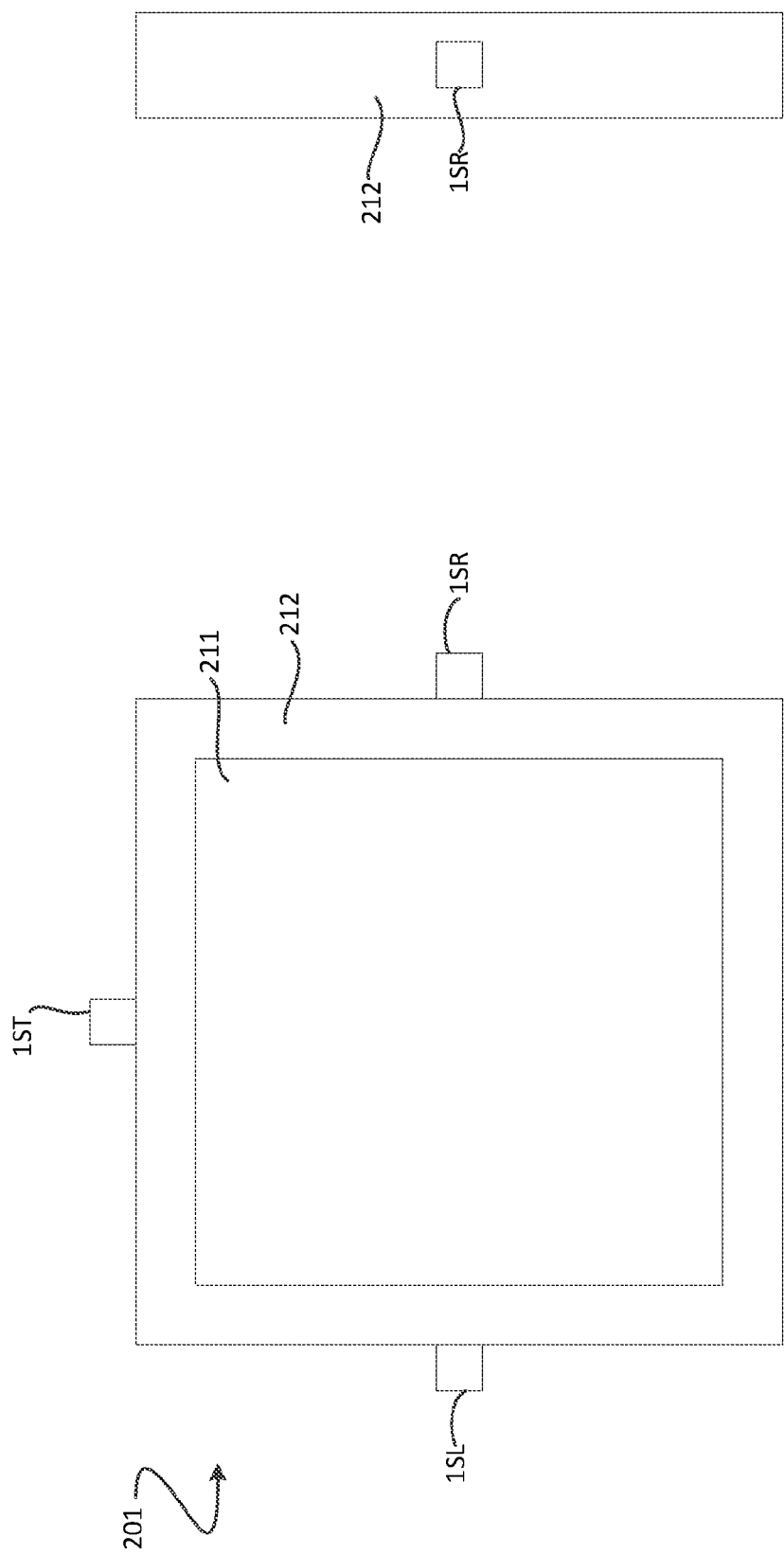
FIG. 3A illustrates a plan view of an example slave digital photo frame of embodiments of the disclosure.
FIG. 3B illustrates a side view of the example digital photo frame of FIG. 3A.

FIG. 3A illustrates a front plan view of an example slave digital photo frame 201 of embodiments of the disclosure, and FIG. 3B illustrates a side view of the example slave digital photo frame 201 of FIG. 3A. It will be understood that the slave digital photo frame 201 may share many features in common with the master digital photo frame 101. For example, the slave digital photo frame 201 may have the same form factor as the master digital photo frame 101, and may share the same processor, memory, display, housing, communications interfaces and/or comprise a media/computing device interface as described above.

The example slave digital photo frame 201 comprises: a slave display 211 located generally centrally and within and on a front face of a slave housing 212. On one edge (in this example, top edge when looking at the slave display 211) of the slave housing 212 there is provided a slave-top port ST; on a right edge there is provided a slave-right port SR, on a bottom edge there is provided a slave-bottom port SB, and on a left edge there is provided a slave-left port SL. However, it will be understood that in other examples any or all of the ports may be provided on the same edge, for example the slave-bottom SB, the slave-top MT, the slave-left SL and/or the slave-right SR ports may be provided on the same edge of the housing 212. In some examples, the slave ports SR, ST, SB, SL may be disposed at a rear side of housing 212/of the slave digital photo frame 201.

Figure 4:
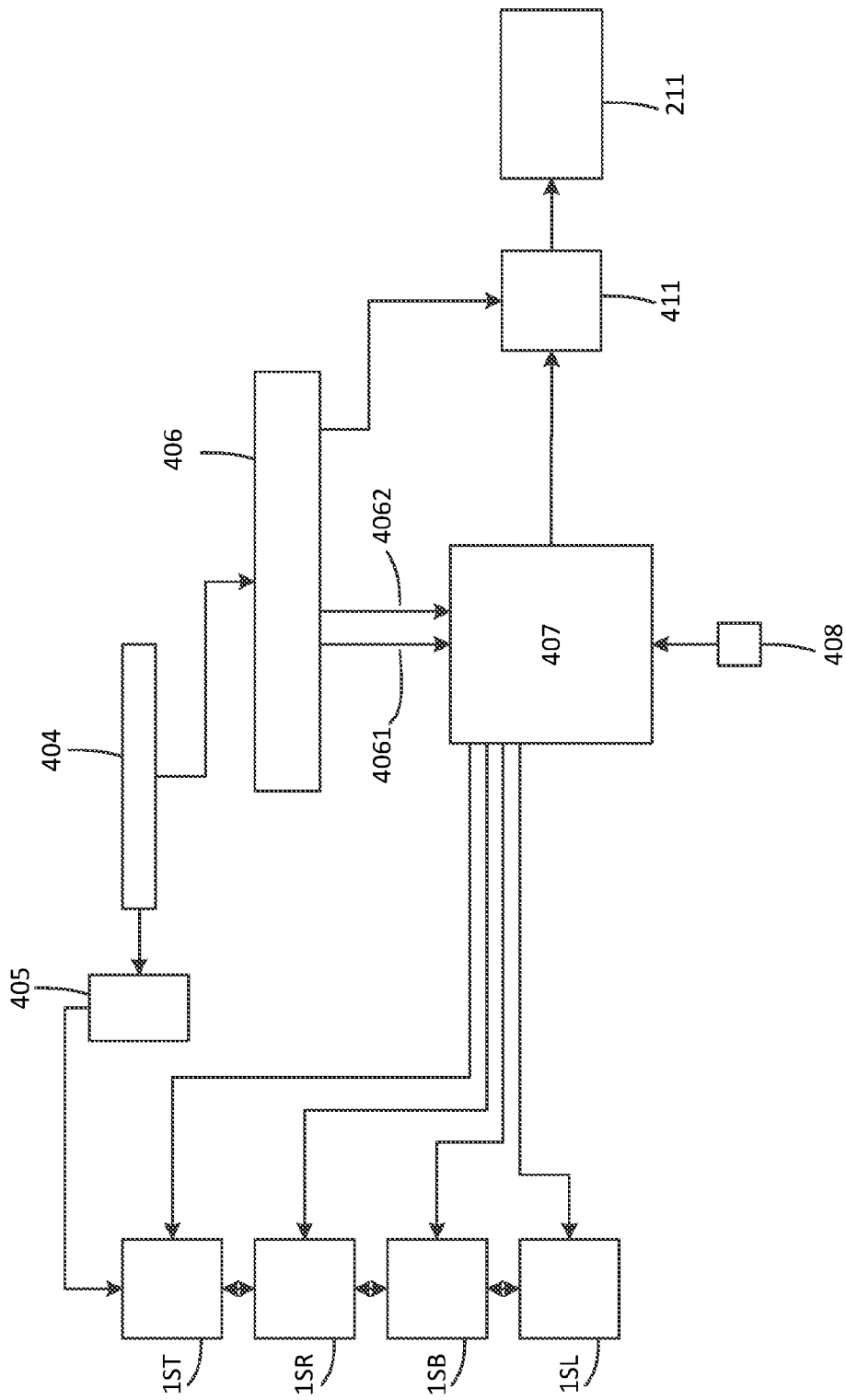
FIG. 4 illustrates a schematic functional diagram of the slave digital photo frame of FIGS. 3A and 3B.

FIG. 4 shows a schematic functional diagram of the example slave digital photo frame 201 of FIGS. 3A and 3B. FIG. 4 shows a slave circuit board that is provided within the housing 212. The slave circuit board supports (by having mounted thereon) a slave processor 407. The slave processor 407 is coupled in parallel to a plurality of media connections for coupling to respective slave digital photo frames. In the example shown the respective media connections are provided by the slave-ports ST, SR, SB and SL. In the example shown the slave-ports ST, SR, SB and SL are of a polarised, bottom-mounted, through-hole type. In the example shown the media connections also double as master communications interfaces. In this way, each media connection also provides a corresponding master communications interface. However, it will be understood that in many examples the slave digital photo frame 201 may comprise only a single port/media connection and also a single master communications interface.

The slave processor 407 is also coupled to power converter 406 and a slave display driver 411. The power converter 406 and slave display driver 411 are also coupled to each other. The slave display driver 411 is coupled to slave display 211. The slave processor 407 is also coupled to slave random access memory 408.

The slave ports ST, SR, SB and SL are coupled in series to slave protection integrated circuits (ICs) 405, that is in turn coupled to a power bus 404, that is in turn coupled to the power converter 406. In this way the slave ports ST, SR, SB and SL are also coupled to both the slave processor 407 and the power converter 406.

The slave processor 407 is also coupled to a plurality of media connections for coupling to respective slave and/or master digital photo frames. In the example shown the respective media connections are provided by the slave-top ST, slave-bottom SB, slave-right SR and slave-left SL ports. In the example shown the media connections also double as power connections. However it will be understood that in other examples the slave digital photo frames 201 may comprise separate media connections.

The media connections may comprise power and ground connections between master ports and slave ports. Each media connection may be rated for a combined PCBA total input and/or output of 3 Amp continuous. Each media connection may be rated to allow a full current of 3A through a single media connection with an average power-ground loop resistance of less than or equal to 72 mΩ.

In some examples, a slave digital photo frame may comprise a frame with any polygonal shape having N sides (where N>2). The slave digital photo frame may comprise up to N slave ports. Each slave port may be disposed on a separate side of the frame. In some examples, the digital photo frames of the digital photo frame display system may all have an identical regular polygonal shape (e.g. rectangular shape) or regular polygonal shape (e.g. square shape).

A desired power conversion may be achieved with a wide input range. In the example shown the power converter 406 is configured to receive an input voltage of 20V directly from the power bus 404. It will of course be understood that the power bus may be operable at other voltages. The power converter 406 is also coupled to the slave processor 407 via respective power lines 4061 and 4062 operating at 1.8 and 3.3 V respectively.

In some examples a first buck converter stage may be provided to generate a lower intermediate voltage, which intermediate voltage is input into the power converter 406. The power converter 406 may have any of: under-voltage lock-out; over-voltage lock-out; over-current; over-temperature protections. The power converter 406 may report a "power good" status to the slave processor 407 in the event that the power converter is operating within selected thresholds and/or when questioned (e.g. by polling) by the slave processor 407.

An example slave processor 407 for use in the slave digital photo frame 201 is an ARM Cortex-M series based processor. The processor may have any one or more of the following minimum features: Video decode hardware; JPEG encode hardware; 2D image accelerator block; Globally Unique ID; JTAG programming Interface; a I2C Interface; four 150 Mbit/s SPI Interfaces; an UART; two ADCs; RAM Interface—Support DDR, 16 bit bus width min @ 133 MHz; Flash Interface—Support NAND, 16 bit bus width min; two DMA Controllers; AMBA System Bus; LCD interface, with 24 bit Parallel, MIPI-DPI, or LVDS; SDIO interface for the Wifi/BLE module; MPU for memory protection.

Slave display 211 may be any of an LED display, an IPS panel, an OLED display, an LCD display, a TFT display, a DLP monitor, a plasma display. In appropriate examples (e.g. for LCD displays) the display may be backlit. For example, the display may be backlit by LEDs. In examples wherein the slave display 211 requires a backlight, more than 50% of the output power from the slave power converter 406 may be required to power the backlight.

The slave RAM 408 may be any of: DDR type; DDR2 type; DDR3 type; SDRAM. The slave RAM size may be within any of the following ranges: 1 Gbit to 8 Gbit; 64 Mbit to 128 Mbit. The slave RAM clock speed depends on processor support, interface and bandwidth requirements. The RAM clock speed may be greater than 133 MHz. The RAM clock speed may be in the range of 200 MHz to 400 MHz.

The main circuit board is configured to allow one or more of electrical components to be mounted thereon. For example, the main circuit board may be a printed circuit board (PCB). The power bus 404 may be configured to receive power from any one of the first slave-ports 1ST, 1SR, 1SB, 1SL. The first slave power bus 404 may comprise slave protection ICs 405. The slave protection ICs 405 may be configured to provide electrostatic discharge (ESD) protection. The protection ICs 305 may be configured to provide overvoltage. There may be provided current-limit protection on the power inputs of the slave-ports ST, SR, SB, and SL.

All of the slave-ports ST, SR, SB and SL, are configured to connect to any of the master ports MT, MR, MB, ML; or slave ports of other slave digital photo frames. Two connected ports (e.g. master-right port MR connected to a slave-left port SL) may allow transmittal of power therethrough in addition to the transmittal of media.

The slave housing 212 may be configured to contain at least some of the components of the first slave digital display 201. For example the slave housing 212 may contain the slave circuit board. The housing 212 may comprise apertures to allow the slave ports ST, SR, SB, SL to be connected to the master ports of a master digital photo frame 101 and/or slave ports of other slave digital photo frames.

As noted above, in the example shown the respective media connections (the slave ports ST, SR, SB, SL) also double as master communications interfaces. This means that in the example shown the slave ports ST, SR, SB and SL are operable to both receive power from a master digital photo frame 101 and also receive media from a master digital photo frame 101 and/or other slave digital photo frames 201 coupled to the master ports MT, MR, MB and ML. However, it will be understood that in other examples the media connections may not double as master communications interfaces and or that only a single media connection and/or master communications interface may be provided for coupling to a master digital photo frame 101 and/or a plurality of other slave digital photo frames 201. For example, a separate master communications interface (such as a wireless interface, for example operable over a short range RF network such as a Bluetooth® and/or Zigbee® network) may be provided—this may be the same communications interface as the slave communications interface of the master digital photo frame 101. It will be understood that when a system comprising such a slave digital photo frame 201 is provided that the master digital photo frames will comprise a corresponding communications interface and/or media connection for communicating with the slave digital photo frame 201.

The slave power converter 406 is configured to convert an input voltage from the slave power bus 404 into one or more output voltages on one or more output rails 4061, 4062. An input voltage may be 20V and a first output rail 4061 may have a first output voltage of 1.8V and a second output rail 4062 may have a second output voltage of 3.3V. In some examples, there may be additional output rails with output voltages suitable for providing a voltage to a slave display 211.

The slave processor 407 is configured to receive power from an output rail of the slave power converter 406. The slave processor 407 is configured to process media packages received by the master processor 407. The slave processor is configured to receive a first slave media from a media package from each the master digital photo frame via the media connections.

The slave display 211 is configured to display media. The media may be a first slave media received by the first slave digital photo frame 201. The slave media is transmitted to the slave display 211 by the slave processor 407. The slave display 211 may be configured to receive power from the power converter 406.

In some examples, the slave media may be transmitted to the slave display 211 by the master processor 407 via the display driver 411. The display driver 411 may be configured to receive power from the power converter 406 via the display driver 411. In some examples the display driver 411 may require several power supplies. In some examples the display driver may require a driver IC. The media may be an image and/or a video.

The slave processor 407 is configured to utilise RAM 308 to perform tasks and calculations. The slave RAM 408 may be configured to satisfy the size and memory bandwidth for a frame buffer. The random access memory size required for the frame buffer to operate the largest display may be expressed mathematically as:

frame buffer=pixels horizontal*pixels vertical*pixel colour depth

In some examples, two frame buffers may provide double-buffering to reduce graphic artefacts.

Figure 5:
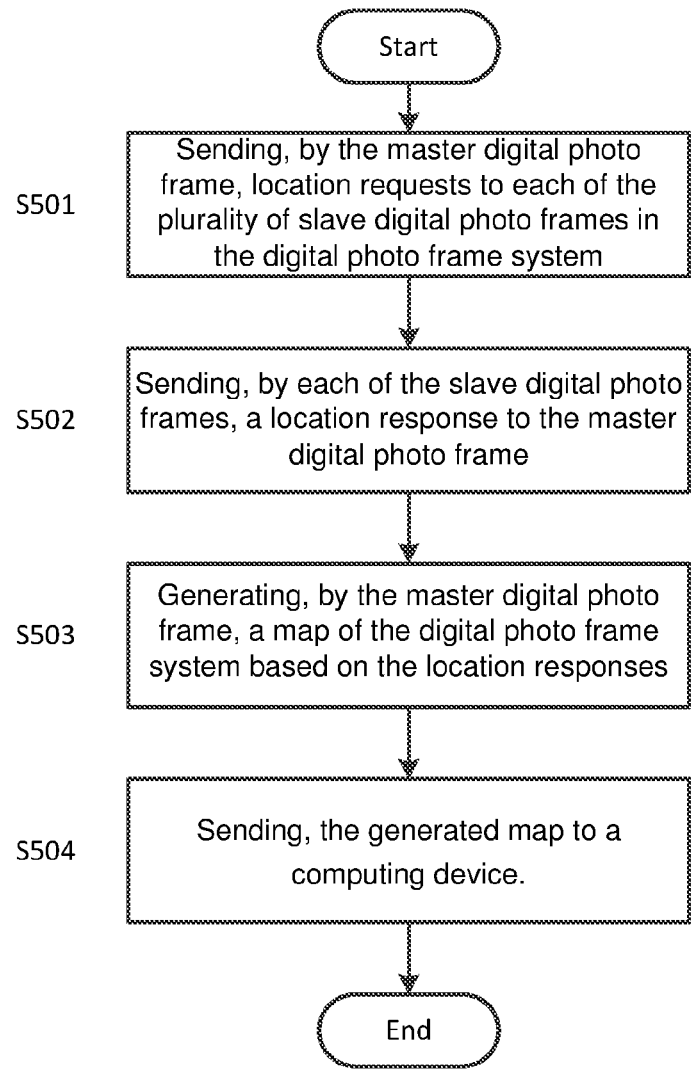
FIG. 5 is a flowchart which illustrates a method of generating a map of the digital photo frame system.

A map of the digital photo frame system may be generated prior to use of the digital photo frame system. FIG. 5 is a flowchart of an example method of generating a map of the digital photo frame system. The method is described below.

Sending S501, by the master digital photo frame 101, location requests to each of the plurality of slave digital photo frames 201, 202, 203, in the digital photo frame system.

The master digital photo frame 101 is configured to send location requests to each of the plurality of slave digital photo frames 201, 202, 203, via the slave communications interface. The slave digital photo frames are configured to receive location requests from the master digital photo frame 101 via the slave communications interface.

In examples, the location request is a simple command to each of the slave digital photo frames 201, 202, 203, instructing each of the slave digital photo frames to send a location response to the master digital display.

In some examples, the location request may comprise: a timestamp indicating the time at which the location request was sent from the master digital photo frame.

Sending S502, by each of the slave digital photo frames 201, 202, 203, a location response to the master digital photo frame.

The slave digital photo frames 201, 202, 203, are configured to send a location response to the master digital photo frame 101 via the communication interface. The master digital photo frame is configured to receive each of the location responses from the plurality of slave digital photo frames via the slave communications interface.

In the example described herein, the location response of each respective slave digital photo frame comprises: an identifier of the individual slave digital photo frame; one or more identifiers of other slave digital photo frames to which the individual slave digital photo frame is directly connected. In some examples the identifier may, for example, be a serial number of a processor or integrated device that forms part of the slave digital photo frame.

In other examples, the location response may comprise a time taken for the location request to be received by the respective slave digital photo frame.

The location response of a given slave digital photo frame is indicative of the respective location of the given slave digital photo frame to the master digital photo frame.

Generating S503, by the master digital photo frame, a map of the digital photo frame system based on the location responses.

The master digital photo frame processes the location response to generate a map of the digital photo frame system. The master processor is configured to process the location response to generate a map of the digital photo frame system. In some examples, the master digital photo frame may comprise an orientation sensor configured to determine the orientation of the master digital frame. The master processor may be configured to process the determined orientation of the master digital frame to generate the map of the digital photo frame system wherein the generated map accounts for the orientation of the master digital photo frame. In some examples, the slave digital photo frames may each comprise an orientation sensor configured to determine the orientation of the respective slave digital frames. The master processor may be configured to process the determined orientation of each of the respective slave digital frames to generate the map of the digital photo frame system wherein the generated map accounts for the orientation of the slave digital photo frames.

In some examples, the master digital photo frame 101 may additionally or alternatively use time delay data (e.g. time delay between: a time of sending a location request from a master digital photo frame; and, a time of receipt of the location request at a given slave digital photo frame) to determine how many slave digital photo frames 201, 202, 203, are between a given slave digital photo frame and the master digital photo frame. The difference between the timestamp of the location request and the time of receipt of the location request at a given slave digital photo frame provides a time indicative of the time delay of a signal sent from the master digital photo frame to a given slave digital photo frame. This assumes that a characteristic constant time delay is introduced when a location request is sent via one slave digital photo frame to another slave digital photo frame.

Sending S504, the generated map to a computing device 251.

The master digital photo frame 101 sends the generated map to the computing device 251 via the computing interface. In the example shown, the master digital photo frame comprises a combined media and computing device interface 312, which in the example shown is a combined WiFi® and Bluetooth® module.

In some examples, connectors of the master digital photo frame may have an associated master connector identifier. For example, the master digital photo frame may comprise four connectors, such as the slave communications interface, a master-top port, a master-left port, a master-bottom port, a master-right port with respectively connector identifiers MT, ML, MB, MR. In some examples, connectors of the slave digital photo frames may have an associated slave connector identifier. For example, a first slave digital photo frame may comprise four connectors, a first slave-top port, a first slave-left port, a first slave-bottom port, a first slave-right port with respectively connector identifiers 1ST, 1SL, 1SB, 1SR. A connection between two digital photo frames comprises a connector from a first digital photo frame connected to connector from a second digital photo frame (e.g. a connection comprising a connector of the master digital display connected to a connector of the first slave digital display). The connector identifier of each connector forming a particular connection may be obtained by a computing device and/or the master digital photo frame, and hence information indicative of which connectors are connected to one another may be obtained. A map of the digital photo frame system may be obtained using the information indicative of which connectors are connected to one another. For example, if the master-bottom port with identifier MB is connected to the first slave-top port 1ST, then information indicative of which connectors are connected to one another may be "MB-1ST" or alternatively "1ST-MD".

For example, the connector identifiers may comprise any of: barcode; QR code; serial number of a component; printed alphanumeric sequence; symbolic representation.

Figure 6:
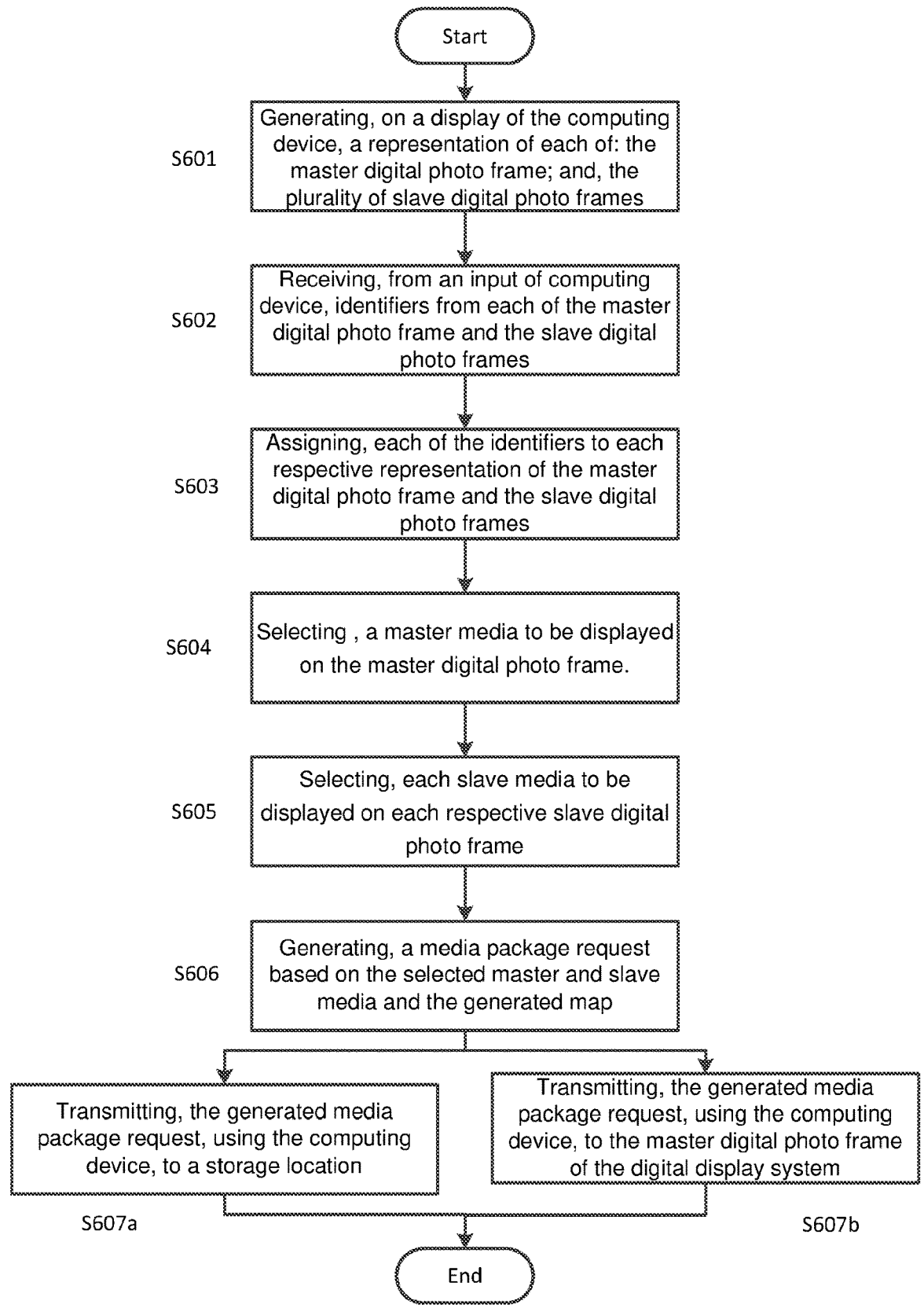
FIG. 6 is a flowchart which illustrates a method of generating a map of the digital photo frame system; and, FIG. 7 illustrates an example digital photo frame system comprising the example master and slave digital photo frames shown in FIGS. 1A, 1B, 3, 4A and 4B.

FIG. 6 is a flowchart of another example method of generating a map of the digital photo frame system and a method of displaying master and slave media on the digital photo frame system. The method is described below.

A computer program is provided for use with a computing device 251. The computer program is configured to: generate a map of a digital photo frame display system comprising a master digital photo frame 101 and a plurality of slave digital photo frames 201, 202, 203, by performing the following steps.

Generating S601, on a display of the computing device 251, a representation of each of: the master digital photo frame 101; and, the plurality of slave digital photo frames 201, 202, 203.

The computing device 251 comprises a display to display a graphical user interface (GUI). The GUI displays a representation of the master digital photo frame 101 and the plurality of slave digital photo frames 201, 202, 203. The representation of the master digital photo frame 101 may differ in appearance from the representations of the slave digital photo frames. Each of the representations include an identifier which identifies which digital photo frame each respective representation represents. For example, the GUI may display a square to represent each digital photo frame and within each square may be provided an identifier in the form of text (e.g. Master, Slave-1, Slave-2, etc.) which identifies which digital photo frame each respective representation represents.

Receiving S602, from an input of computing device 251, identifiers from each of the master digital photo frame 101 and the slave digital photo frames 201, 202, 203.

The identifiers may be any distinguishing code on each digital photo frame. The identifiers may comprise any of: barcode; QR code; serial number (e.g. serial number of a processor); printed alphanumeric sequence; symbolic representation. The computing device input may be any suitable means to capture the information represented by the identifiers. For example, the input may provide by a camera, wherein a user uses the camera to capture an image of any of: a barcode; a QR code; serial number; printed alphanumeric sequence; symbolic representation. In such examples, the computing device 251 may comprise suitable hardware and or software to process the captured image. In some examples, the input may be provided by a keyboard, wherein a user using the keyboard types any of: serial number; printed alphanumeric sequence. In such examples, the computing device 251 may comprise suitable hardware and or software to process the captured image.

Assigning S603, each of the identifiers to each respective representation of the master digital photo frame 101 and the slave digital photo frames 201, 202, 203.

The user matches the respective representations of S601 with the respective identifiers of S602. The user may match: the representation of the master digital display with the identifier of the master digital display; the representation of a first slave digital display with the identifier of the first slave digital display. This process is continued until all of the representations have been matched to all of the identifiers.

For example, the user interacts with the GUI of the computer program to match the representations to the identifiers.

For example, to perform the step of assigning S603, the user may select the representation of the master digital display using the GUI, and then perform S602 to input the identifier of the master digital display. The computer program will accordingly assign the identifier of the master digital display to the representation of the master digital display. The user may select the representation of the first slave digital display using the GUI, and then perform S602 to input the identifier of the first slave digital display. The computer program will accordingly assign the identifier of the first slave digital display to the representation of the first slave digital display. This process is continued until all of the representations have been matched to all of the identifiers.

Optionally, selecting S604, a master media to be displayed on the master digital photo frame.

Optionally, selecting S605, each slave media to be displayed on each respective slave digital photo frame;

The computing device 251 wirelessly communicates with a storage location (the server 252). The storage location may store a catalogue of media. In some examples, the storage location is a social media server. The computer program retrieves the media from the storage location and displays the media on the computing device. The user may be able to browse the media and select a master media for display on the master digital photo frame 101 and select a slave media for display on each respective slave digital photo frame.

For example, once S603 is complete a user is prompted to select a master media from the media catalogue. The user interacts with the GUI to input a selection of the master media. After the master media has been selected, the user is prompted to select a first slave media from the media catalogue. The user interacts with the GUI to input a selection of the first slave media. This process is continued until a media has been selected for each of the digital photo frames.

In some examples, the user selects a single media to be displayed over a plurality of the digital photo frames. For example, the user selects an original media which is split into four pieces. Each of the four pieces is displayed in four separate digital photo frame. The four separate digital photo frames are arranged so that the four pieces of the media are displayed to maintain their relative positional arrangement in the original media and so to reproduce the original media.

In some examples, the computing device 251 stores a catalogue of media. In such examples, the computing device sends the media to the digital photo frames over a wireless network and/or by Bluetooth.

Optionally, generating S606, a media package request based on the selected master and slave media and the generated map. For example, the computer program uses the user selection of master and slave media in S604 and S605 respectively to form a location portion of the media package. For example, the computer program generates a header portion of the media package. The media package request may comprise: an IP address of the storage location; an IP address of the master digital photo frame; identifiers of the master and slave media. The media package request may also contain user credentials (e.g. email address/username and password) used to identify and provide access to a social media network for a user.

Optionally, transmitting S607a, the generated media package request, using the computing device 251, to a storage location 252.

The computing device 251 comprises a transmittal means. For example, the computing device 251 may be configured to send signals via a short-range radio frequency network, such as a Wi-Fi® network, a Bluetooth® and/or a ZigBee® network. The computer program instructs the computing device 251 to transmit the generated media package request to the storage location 252 via the transmittal means. For example, the computer program instructs the computing device to transmit the generated media package request to the storage location 252 via a short-range radio frequency network such as a Wi-Fi® network.

Optionally, transmitting S607b, the generated media package request, using the computing device 251, to the master digital photo frame 101 of the digital display system.

The computing device 251 comprises a transmittal means. For example, the computing device 251 may be configured to send signals via a short-range radio frequency network, such as a Wi-Fi® network, a Bluetooth® and/or a ZigBee® network. The computer program instructs the computing device 251 to transmit the generated media package request to the master digital photo frame 101 via the transmittal means. For example, the computer program instructs the computing device to transmit the generated media package request to the master digital photo frame via a short-range radio frequency network such as a Wi-Fi® network.

The master digital photo frame 101 is configured to receive a media package request from the computing device 251. The master digital photo frame 101 may receive the media package request via the computing device interface 312.

The master digital photo frame 101 sends a media package request to the storage location 252. The media package request is sent via the media interface. The media interface is a combined media and computing device interface 312, which in the example shown is a combined WiFi® and Bluetooth® module. The media interface sends media package requests and receives media packages via a WiFi® network. In examples of the disclosure, the storage location is a server that receives the media package request via the internet.

The media package request comprises a master and slave media request portion, configured to instruct the storage location to send specified master and slave media to the master digital photo frame, and a location portion, configured to instruct the master digital photo frame 101 to send each of the plural slave media to respective slave digital photo frames 201, 202, 203, based on the generated map.

The master and slave media request portion is a set of references which denote positions in a media catalogue of the requested master and slave media. The storage location dereferences the set of references to the requested master and slave media.

The location portion comprises a set of instructions which instruct the master digital photo frame 101 which frame to send each of the request media.

Figure 7:
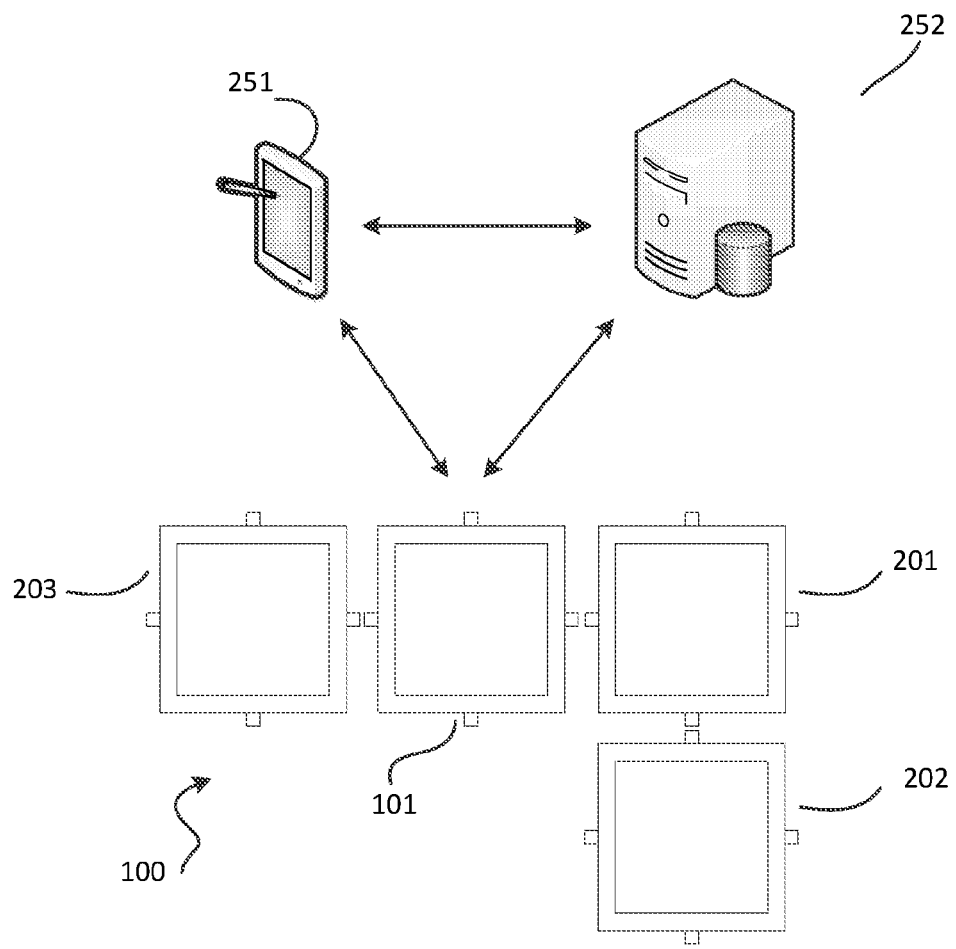

FIG. 7 shows a schematic view of a digital photo frame system 100, a computing device 251 and a storage location 252. The computing device 251 and the storage location 252 may be the computing device 251 and storage location 252 as described above. The digital photo frame system 100 comprises a master digital photo frame 101 (for example as discussed above with reference to FIGS. 1A, 1B and 2), a first slave digital photo frame 201, a second slave digital photo frame 202, and a third slave digital photo frame 203. The first, second and third slave digital photo frames 202, 202 and 203 may be identical and may be the slave digital photo frame as discussed above with reference to FIGS. 3A, 3B and 4. In the examples shown, both the master and slave digital photo frames have the same size and dimensions, with respective square housings. In this way the master and slave digital photo frames can be tessellated and arranged into any arrangement that the user desires.

The master digital photo frame 101 is configured to provide power to the plurality of slave digital photo frames 201, 202, 203. The master ports and the slave ports are connected to provide media connections as described herein. The master-right port MR is connected to a slave-left port SL of a first slave digital photo frame to form a media connection. The slave-right port SR of the first slave digital photo frame is connected to a slave-left port SL of a second slave digital photo frame to form a media connection. The master-left port ML is connected to a slave-right port SR of a third slave digital photo frame to form a media connection. The media connections may be configured to allow (in addition to media) power to be transferred from the master digital photo frame 101 to the plurality of slave digital photo frames 201, 202, 203. It will be understood, however, that the arrangement described above is merely exemplary and that slave digital photo frames may be connected to the master digital photo frame in parallel or series, or a combination of in parallel and in series. In some examples, the master digital photo frame 101 may be connected to slave digital photo frames 201, 202, 203, using a small bridging board. For example, the small bridging board may comprise a passive electrical connector configured to transmit power (and, in some examples, configured to transmit media) between the digital photo frames. In some examples, the small bridging board may additionally be configured to provide mechanical rigidity between connected digital photo frames.

In some examples the master digital photo frame 101 may wirelessly provide power to the plurality of slave digital photo frames 201, 202, 203. For example, the master digital photo frame 101 and the plurality of slave digital photo frames 201, 202, 203 may comprise inductive coupling means configured to transmit and receive power in the form of alternating electromagnetic fields.

The master digital photo frame 101 and the plurality of slave digital photo frames 201, 202, 203 may comprise contiguous coupling means configured to allow releasable contiguous coupling of any two of the digital photo frames. In some examples, the contiguous coupling means are magnets disposed at each side of each of the digital photo frames. In some examples of the present disclosure, the digital photo frames of the digital photo frame display system may all have an identical regular polygonal shape (e.g. rectangular shape) or regular polygonal shape (e.g. square shape). Conveniently, example digital photo frame display systems comprising digital photo frames having a regular polygonal shape may allow an end user to tessellate the frames together into any configuration they desire. In some examples, the master digital photo frame 101 and the slave digital photo frames 201, 202, 203, are suitable for mounting on a wall to provide the digital photo frame display system. In some examples, only the master digital photo frame 101 is fixed to a wall and the slave digital photo frames may be fixed to the master digital photo frame 101 and/or other slave digital photo frames by the contiguous coupling means.

In the example shown in FIG. 7, power is transferred from the master digital photo frame 101 to the slave digital photo frames via the media connections. The first and third slave digital photo frames 201, 203, are powered directly from the master digital photo frame 101 via the media connections formed respectively by the slave-right port SR of the first slave digital photo frame that is connected to the slave-left port SL of the second slave digital photo frame; and, the master-left port ML is connected to the slave-right port SR of the third slave digital photo frame.

The second slave digital photo frame is powered indirectly from the master digital photo frame 101 via the first slave digital photo frame. In the example shown, the media connections formed by the first slave-right port SR is connected to the slave-left port SL of the second slave digital photo frame and, the slave-right port SR of the first slave digital photo frame is connected to the slave-left port SL of the second slave digital photo frame to transfer power from the master digital photo frame to the second slave digital photo frame.

In some examples the master digital photo frame may deliver power to the slave digital photo frames by a "hardware" power negotiation means.

For example, a hardware power negotiation means may be configured such that each slave digital photo frame and master digital photo frame takes a required power from the power inlet of the master digital photo frame. In some examples, protection circuitry may be provided at the master ports and/or the slave ports to ensure voltage and/or current limits of the slave digital photo frames are not exceeded. For example, independent electronic circuits may be provided in the master digital photo frame and/or the slave digital photo frames configured to cut-out if voltage and/or limits were exceeded.

In some examples the master digital photo frame may deliver power to the slave digital photo frames by a "software" power negotiation means.

For example, a software power negotiation means may be configured such that each of the slave digital photo frames initially turn on in a lower-power mode (e.g. wherein only communications are enable and the slave display is off). Each slave digital photo frame may be configured to subsequently request permission from the master digital photo frame to go to a higher-power mode (e.g. wherein full operation of the slave digital photo frame is enabled). In some examples, the master digital photo frame may be configured to determine how may slave digital photo frames are connected (either directly or indirectly) to the master digital photo frame. In some examples, the master digital photo frame may be configured to determine the exact power consumption of all of the slave digital photo frames connected (either directly or indirectly) to the master digital photo frame. In some examples, the master digital photo frame may be configured to instruct connected slave digital photo frames to power-down, and/or report warnings via the computer program. For example, the warnings may include: if the maximum number of slave digital photo frames has been exceeded; if the maximum power consumption of the slave digital photo frames has been exceeded.

In some examples the master digital photo frame may deliver power to the slave digital photo frames by a combination of a "hardware" power negotiation means and a "software" power negotiation means.

In use, the master digital photo frame 101 receives a media package request from a computing device 251. In the example shown the computing device 251 transmits the media package request to the master digital photo frame via Bluetooth®. In the example shown the master digital photo frame 101 comprises a combined media and computing device interface 312, which in the example shown is a combined WiFi® and Bluetooth® module. The media interface 312 wirelessly receives media package requests from the computing device 251.

The media request may have been generated by a user running a computer program (such as the computer program described above) on the computing device 251 configured to interact with the digital photo frame system 100. For example, the computing device 251 may be a smartphone or tablet, and the user may be logged into a social media networking platform on the computing device 251. The media request may therefore contain credentials of the user so that the media request permits the system 100 to obtain media from the storage location 252 which may be a server of the social media networking platform which the user is logged into on the computing device 251.

The master digital photo frame 101 wirelessly transmits media package requests via the media interface 312 to the storage location 252. In the example shown in FIG. 7 the media interface 312 is a combined media and computing device interface 312, which in the example shown is a combined WiFi® and Bluetooth® module. In the example shown in FIG. 7 the storage location 252 is a server which is remote from the digital photo frame system, such as a social media network server. In the example shown, the media interface 312 of the master digital photo frame 101 transmits the media package request to the storage location 252 via a wireless WiFi® router.

The storage location 252 reads the media package request, and in response the storage location 252 transmits a media package to the master digital photo frame 101. The media package comprises the master media and slave media requested in the master and slave media portion of the media package request.

The master digital photo frame 101 comprises a media interface configured to wirelessly receive the media package from the storage location 252. As described previously, in the example shown the media interface is a combined media and computing device interface 312, which in the example shown is a combined WiFi® and Bluetooth® module.

The master processor 307 of the master digital photo frame 101 processes media packages received from the storage location 252 into respective master media and plural slave media. The master processor 307 transmits each of the plural slave media to the respective plural slave digital photo frames 201, 202, 203, via the slave communications interface, which in the example shown, the slave communication interface comprises the media connections formed by the connected master and slave ports.

The master processor 307 processes the master media into a format which is capable of being displayed on the master display. The slave processor 407 of each slave digital photo frames 201, 202, 203, processes the received slave media. Each slave processor 407 processes the received slave media into a format which is capable of being displayed on the respective slave display 411.

Although the examples described above have been described as relating to digital photo frames, it will be understood that in other examples the system may not be limited to digital photo frames and/or static images. For example, other examples may use digital displays that are capable and/or configured to display video media.

Certain features of the methods described herein may be implemented in hardware, and one or more functions of the apparatus may be implemented in method steps. It will also be appreciated in the context of the present disclosure that the methods described herein need not be performed in the order in which they are described, nor necessarily in the order in which they are depicted in the drawings. Accordingly, aspects of the disclosure which are described with reference to products or apparatus are also intended to be implemented as methods and vice versa. The methods described herein may be implemented in computer programs, or in hardware or in any combination thereof. Computer programs include software, middleware, firmware, and any combination thereof. Such programs may be provided as signals or network messages and may be recorded on computer readable media such as tangible computer readable media which may store the computer programs in non-transitory form. Hardware includes computers, handheld devices, programmable processors, general purpose processors, application specific integrated circuits (ASICs), field programmable gate arrays (FPGAs), and arrays of logic gates.

Any processors used in the computer system (and any of the activities and apparatus outlined herein) may be implemented with fixed logic such as assemblies of logic gates or programmable logic such as software and/or computer program instructions executed by a processor. The computer system may comprise a central processing unit (CPU) and associated memory, connected to a graphics processing unit (GPU) and its associated memory. Other kinds of programmable logic include programmable processors, programmable digital logic (e.g., a field programmable gate array (FPGA), a tensor processing unit (TPU), an erasable programmable read only memory (EPROM), an electrically erasable programmable read only memory (EEPROM), an application specific integrated circuit (ASIC), or any other kind of digital logic, software, code, electronic instructions, flash memory, optical disks, CD-ROMs, DVD ROMs, magnetic or optical cards, other types of machine-readable mediums suitable for storing electronic instructions, or any suitable combination thereof. Such data storage media may also provide the data store of the computer system (and any of the apparatus outlined herein).

Other examples and variations of the disclosure will be apparent to the skilled addressee in the context of the present disclosure.

The invention claimed is:

1. A digital photo frame system comprising:
a master digital photo frame configured to display a master media;
a plurality of slave digital photo frames configured to display a plurality of slave media; wherein the master digital photo frame is configured to:
provide power to the plurality of slave digital photo frames;
receive a media package from a storage location, wherein the media package comprises:
the master media; and,
the plurality of slave media;
and wherein the master digital photo frame is configured to send each of the plurality of slave media to a respective slave photo frame; generate a map of the digital photo frame system based on respective locations of the plurality of slave digital photo frames to the master digital photo frame; and
send the generated map to a computing device.

2. The digital photo frame system of claim 1, wherein the master digital photo frame comprises:
a media interface configured to:
wirelessly transmit media package requests to the storage location, wherein the storage location is remote from the digital photo frame system; and
wirelessly receive the media package from the storage location.

3. The digital photo frame system of claim 2, wherein the master digital photo frame comprises:
a computing device interface configured to wirelessly receive media package requests from a computing device.

4. The digital photo frame system of claim 3, wherein the master digital photo frame comprises:
a slave communications interface configured to:
transmit slave media from the master digital photo frame to the slave digital photo frames.

5. The digital photo frame system of claim 4, wherein the master digital photo frame is configured to:

process media packages received from the storage location into respective master media and plural slave media; and,
transmit each of the plural slave media to the respective plural slave digital photo frames via the slave communications interface.

6. The digital photo frame system of claim 5, wherein the slave communications interface comprises media connections each configured to respectively physically connect the master digital display to the plurality of slave digital displays, and wherein the master digital photo frame transmits each of the plural slave media to the respective plural slave digital photo frames via the respective media connections of the slave communications interface.

7. The digital photo frame system of claim 6, wherein the respective media connections are configured to allow power to be transferred from the master digital photo frame to the plurality of slave digital photo frames.

8. The digital photo frame system of claim 1, wherein:
the master digital photo frame is configured to send location requests to each of the plurality of slave digital photo frames via the slave communications interface; and
the slave digital photo frames are configured to send a location response to the master digital photo frame via the communication interface;
wherein the location response of each respective slave digital photo frame comprises any one or more of the following data:
an identifier of the individual slave digital photo frame;
one or more identifiers of other slave digital photo frames to which the individual slave digital photo frame is directly connected;
a time taken for the location request to be received by the respective slave digital photo frame.

9. The digital photo frame system of claim 1, wherein the media package request comprises:
a master and slave media request portion, configured to instruct the storage location to send specified master and slave media to the master digital photo frame; and,
a location portion, configured to instruct the master digital photo frame to send each of the plural slave media to respective slave digital photo frames based on the generated map.

10. The digital photo frame system of claim 9, wherein: the master and slave media request portion and the location portion of the media package request are determined by a user input on the computing device.

11. The digital photo frame system of claim 1, wherein:
each of the master digital photo frame and the plurality of slave digital photo frames comprises an orientation sensor configured to determine an orientation of each of the frames; and,
each of the master digital photo frame and the plurality of slave digital photo each of the master digital photo frame and the plurality of slave digital photo frames is configured to display the respective media at an orientation based on the determined orientation of the frame.

12. The digital photo frame system of claim 1, wherein at least any two of:
the master digital photo frame; and
the plurality of slave digital photo frames;
comprise contiguous coupling means configured to allow releasable contiguous coupling of any two of the digital photo frames.

13. A non-transitory computer-readable medium storing a computer program comprising program code instructions, which, when executed by a processor:
  generate a map of a digital photo frame display system comprising a master digital photo frame and a plurality of slave digital photo frames by performing the steps of:
    generating, on a display of the computing device, a representation of each of the master digital photo frame and the plurality of slave digital photo frames;
    receiving, from an input of computing device, identifiers from each of the master digital photo frame and the slave digital photo frames;
    assigning, each of the identifiers to each respective representation of the master digital photo frame and the slave digital photo frames.

14. The non-transitory computer-readable medium computer of claim 13, wherein the computer program is configured to:
  select, a master media to be displayed on the master digital photo frame;
  select, each slave media to be displayed on each respective slave digital photo frame;
  generate a media package request based on the selected master and slave media and the generated map.

15. The non-transitory computer-readable medium of claim 14, wherein the computer program is configured to: transmit the generated media package request, using the computing device, to a storage location.

16. The non-transitory computer-readable medium of claim 15, wherein the computer program is configured to: transmit the generated media package request, using the computing device, to the master digital photo frame of the digital display system.

17. A non-transitory computer-readable medium storing a computer program comprising program code instructions, which, when executed by a processor:
  generate a map of a digital photo frame display system comprising a master digital photo frame and a plurality of slave digital photo frames by performing the steps of:
    generating, on a display of the computing device, a representation of each of the master digital photo frame and the plurality of slave digital photo frames;
    receiving, from an input of computing device, identifiers from each of the master digital photo frame and the slave digital photo frames;
    assigning, each of the identifiers to each respective representation of the master digital photo frame and the slave digital photo frames,
  wherein the computer program is configured to control the computing device to interact with a digital photo frame system, the digital photo frame system comprising:
    a master digital photo frame configured to display a master media;
    a plurality of slave digital photo frames configured to display a plurality of slave media; wherein the master digital photo frame is configured to:
    provide power to the plurality of slave digital photo frames;
    receive a media package from a storage location, wherein the media package comprises:
      the master media; and,
      the plurality of slave media; and
  wherein the master digital photo frame is configured to send each of the plurality of slave media to a respective slave photo frame; generate a map of the digital photo frame system based on respective locations of the plurality of slave digital photo frames to the master digital photo frame; and send the generated map to a computing device.

* * * * *